United States Patent
Takuma et al.

(10) Patent No.: US 7,584,184 B2
(45) Date of Patent: Sep. 1, 2009

(54) SYSTEM OF EFFECTIVELY SEARCHING TEXT FOR KEYWORD, AND METHOD THEREOF

(75) Inventors: Daisuke Takuma, Sagamihara (JP); Issei Yoshida, Tokyo (JP); Yuta Tsuboi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 11/555,790

(22) Filed: Nov. 2, 2006

(65) Prior Publication Data

US 2007/0136274 A1 Jun. 14, 2007

(30) Foreign Application Priority Data

Dec. 2, 2005 (JP) .................. 2005-349717

(51) Int. Cl.
*G06F 7/00* (2006.01)
(52) U.S. Cl. .................. 707/5; 704/3; 704/9; 704/240
(58) Field of Classification Search .................. None
See application file for complete search history.

(56) References Cited

U.S. PATENT DOCUMENTS

| | | | | |
|---|---|---|---|---|
| 5,297,039 A | * | 3/1994 | Kanaegami et al. | 707/5 |
| 5,375,235 A | * | 12/1994 | Berry et al. | 707/5 |
| 5,745,745 A | * | 4/1998 | Tada et al. | 707/1 |
| 5,937,422 A | * | 8/1999 | Nelson et al. | 715/206 |
| 6,212,517 B1 | * | 4/2001 | Sato et al. | 707/5 |
| 2005/0240394 A1 | * | 10/2005 | Oda | 704/9 |

FOREIGN PATENT DOCUMENTS

| | | |
|---|---|---|
| JP | H01-259418 | 10/1989 |
| JP | H11-133919 | 5/1999 |
| JP | 2003-203089 | 7/2003 |

OTHER PUBLICATIONS

Nasukawa et al., "Text Analysis and Knowledge Mining System", IBM Systems Journal, vol. 40, No. 4, pp. 967-984, 2001.
Wang et al., "STING: A Statistical Information Grid Approach To Spatial Data Mining", Proc. Of the $23^{rd}$ VLDB Conference Athens, Greece, pp. 1-10, 1997.
Yu et al., "Distributed Top-N Query Processing With Possibly Uncooperative Local Systems", Proc. Of the 29th VLDB Conference Berlin, Germany, pp. 1-16, 2003.

* cited by examiner

*Primary Examiner*—Tim T. Vo
*Assistant Examiner*—Hasanul Mobin
(74) *Attorney, Agent, or Firm*—Frederick W. Gibb; Shimokaji & Associates, P.C.

(57) ABSTRACT

A system of the present invention stores: a first index which designates lists of keywords contained in texts from identifications of the respective texts; a second index which designates lists of texts containing keywords from identifications of the respective keywords; and the number of texts containing the respective keywords. Then, upon receiving an input of a text search condition, the system calculates an estimation of search time by the first index and an estimation of search time by the second index, and determines which one of the first and second indexes makes a search faster. Then, by using the index which has been determined to make the search faster, the system searches for keywords which appear in texts satisfying the text search condition with higher frequency.

2 Claims, 11 Drawing Sheets

| CATEGORY | CATEGORY KEYWORD / KEYWORD | MAIN SUBJECT (NOT GIVEN) (6974) | MAIN SUBJECT SOCIETY (1977) | MAIN SUBJECT SPORTS (1036) | MAIN SUBJECT BUSINESS (697) | MAIN SUBJECT INTERNATIONAL (770) | ..... |
|---|---|---|---|---|---|---|---|
| SUBSTANTIVE WORD | CHINA (660) | 539 (1.5) | 16 (0.2) | 3 (0.1) | 13 (0.4) | 53 (1.4) | ..... |
| SUBSTANTIVE WORD | REUTER (412) | 412 (1.9) | 0 | 0 | 0 | 0 | ..... |
| SUBSTANTIVE WORD | JAPAN (337) | 169 (0.9) | 13 (0.3) | 58 (2.2) | 11 (0.6) | 31 (1.6) | ..... |
| SUBSTANTIVE WORD | TOKYO (251) | 64 (0.5) | 88 (2.3) | 15 (0.8) | 45 (3.4) | 1 (0.1) | ..... |
| ..... | | ..... | | | | | |

FIG. 10

| TEXT SEARCH CONDITION | CATEGORY | CONVENTIONAL TECHNIQUE (ms) | PROPOSED TECHNIQUE (ms) |
|---|---|---|---|
| WIN95 | GENERAL NOUN | 24703 | 641 |
|  | NOUN | 20578 | 453 |
|  | PROPER NOUN | 16640 | 406 |
|  | COMMAND | 734 | 109 |
|  | HARDWARE | 3906 | 172 |
|  | SOFTWARE | 3875 | 188 |
|  | TECHNICAL TERM | 2188 | 125 |

FIG. 11

| CATEGORY | KEY_TO_DOC (ms) | DOC_TO_KEY (ms) |
|---|---|---|
| (ALL) | 29500 | 15672 |
| Common Noun | 10359 | 9844 |
| Biomedical terms | 5766 | 6218 |
| Protein | 1031 | 2313 |
| Chemocal | 562 | 1610 |

FIG. 12

SYSTEM OF EFFECTIVELY SEARCHING TEXT FOR KEYWORD, AND METHOD THEREOF

BACKGROUND OF THE INVENTION

The present invention relates to a system of searching texts for keywords and a method thereof, and particularly to a system of effectively searching for keywords by using indexes prepared in advance and a method thereof.

Along with recent progress in communications networks and information processing apparatuses, many texts are stored as digital data. Consequently, text mining has drawn attention as a technology for obtaining useful information from among these texts. In text mining, there is a practical problem that "N keywords belonging to any category are detected in descending order of frequency of appearance from among a set of texts which have been narrowed down under any search condition (refer to Yu C, Philip G, Meng W Y. Distributed top-n query processing with possibly uncooperative local systems, Proc. of the $29^{th}$ Int'l Conf. on Very Large Data Bases. Berlin: Morgan Kaufmann Publishers, 2003. 117-128, hereinafter referred to as Non-patent Document 1).

A solution to the above problem can be obtained by constructing an RDB (Relational Database) with identifications of texts and identifications of keywords as primary keys. This RDB is, for example, a database which records keywords contained in a certain text, in a way that the keywords correspond to the text. However, in a case of using such an RDB, if the number of texts becomes huge, search time also becomes enormous. Therefore, heretofore, a technology for calculating the above problem in parallel by using a plurality of information processing apparatuses has been proposed (refer to Non-patent Document 1).

However, the method of the above-described Non-patent Document 1 requires parallel/distributed computing systems, and costs a huge amount of money and time. That is, for example, a plurality of information processing apparatuses have to be installed, and these information processing apparatuses have to be connected with fast communications networks. Hence, it is desired that an effective search technology, which makes it possible to perform a search by using a single information processing apparatus, is developed. For example, it is conceivable that it is possible to speed up a search, by applying a conventional text search technology, by using identifications of texts and keywords as numbers, and by beforehand preparing data for indexes and hash structures based on the numbers. Specifically, the following two indexes can be considered.

(1) KEY_TO_DOC Index

This index is reference from identifications of keywords being arranged in descending order of frequency of appearance to a list of identifications of texts containing the keywords.

(2) DOC_TO_KEY Index

This index is reference from identifications of texts to a list of keywords contained in the texts.

In a process using the index (1) described above, for example, keywords are sequentially selected in descending order of the frequency of appearance, and it is determined whether a list of texts containing the keywords satisfies a text search condition. N keywords are selected in descending order of the number of texts satisfying the text search condition, and the selected result becomes a search result. However, in a case where there are many kinds of keywords to be search targets, it requires search time depending on the number of kinds of keywords.

In a process using the index (2) described above, for example, texts satisfying a text search condition are selected, and a list of keywords corresponding to the identifications of the texts is obtained. Then, the number of texts which contain the keywords are counted for respective keywords. However, in a case where there are many kinds of texts to be search targets, it requires search time depending on the number of kinds of texts. Although it is conceivable to speed up a search by sampling some texts, search accuracy is reduced in a case where a sufficient number of texts are not prepared.

SUMMARY OF THE INVENTION

Accordingly, an object of the present invention is to provide a system, a method, and a program, which make it possible to solve the above-described problems. This object is achieved by combining features as recited in independent claims in the scope of claims. Moreover, dependent claims define further advantageous specific examples of the present invention.

In order to solve the above-described problems, in a first embodiment of the present invention, provided is a system for searching texts for keywords, the system comprising: a first index storage unit for storing a first index which designates lists of keywords contained in the texts from identifications of the respective texts; a second index storage unit for storing a second index which designates lists of texts containing the keywords from identifications of the respective keywords, in a way that the second index corresponds to the number of texts containing the respective keywords; an input unit for receiving an input of a text search condition which is a condition of texts to be search targets of the keywords; a determination unit for calculating an estimation of search time by the first index and an estimation of search time by the second index, based on the number of texts satisfying the text search condition among the plurality of texts to be search targets, and based on the number of the texts stored in a way that the number corresponds to the second index, and for determining which one of the first and second indexes makes a search faster; and a search unit for searching for and outputting keywords which appear in texts satisfying the text search condition with higher frequency than a predetermined standard, by using the index which is determined to make the search faster. Also provided is a method of searching for keywords by the system, and a program for causing an information processing apparatus to function as the system.

A second aspect of the present invention is to provide a system for searching texts for keywords, the system comprising: a second index storage unit for storing a second index which designates lists of texts containing the keywords from identifications of the respective keywords; an input unit for receiving an input of a text search condition which is a condition of texts to be search targets of the keywords; and a search unit for high frequency words by selecting a predetermined standard number of keywords in descending order of the number of texts, the texts containing the keywords out of a plurality of keywords and satisfying the text search condition, the search unit further comprising: a candidate word storage unit for storing the number of appearance of candidate words, in a way that the number corresponds to the candidate words to be candidates for the high frequency words, the number being the number of the texts which contain the candidate words and which satisfy the text search condition; a selection unit for sequentially selecting a plurality of keywords in descending order of the number of texts containing the keywords, each of the plurality of keywords being selected as a target word to be a target which is determined whether or not to be one of the high frequency words; a comparison unit for reading the number of texts containing the target word from the second index storage unit, and for comparing the read number of the texts and the number of appearance of the candidate words; a calculation unit for reading lists of texts containing the target word from the second index storage unit, and for calculating the number of texts satisfying the text search condition among the read lists of texts, provided that the read number of the texts is greater than the number of appearance of any one of the candidate words; and an update unit for adding a target word as a candidate word to the candidate word storage unit, and for removing another candidate word stored in the candidate word storage unit from the candidate storage unit, provided that the calculated number of the texts is greater than the number of appearance of any one of the candidate words, wherein the search unit outputs the keywords stored in the candidate word storage unit as the high frequency words, provided that the number of texts containing the target word which have been subsequently selected by the selection unit is smaller than the number of appearance of any one of the candidate words. Also provided is a method of searching for keywords by the system, and a program for causing an information processing apparatus to function as the system.

Incidentally, the above summaries of the invention do not enumerate the whole aspects of the present invention, and sub-combinations of these aspects can also be inventions.

BRIEF DESCRIPTION OF THE DRAWINGS

For a more complete understanding of the present invention and the advantage thereof, reference is now made to the following description taken in conjunction with the accompanying drawings.

FIG. 10 is a table showing searched results of keywords to be searched by the present embodiment.

FIG. 11 is a table showing a comparison between time required for searching for keywords by a conventional technique and time required for searching for keywords by a proposed technique.

FIG. 12 is a table showing a comparison between time required for searches using a first index and time required for searches using a second index.

DETAILED DESCRIPTION OF THE PREFERRED EMBODIMENT

Although the present invention will be described by using an embodiment hereinafter, the embodiment is not intended to limit the inventions according to the scope of claims, and all the combinations of features described in the embodiment are not necessarily essential for solving means of the invention.

Figure 1:
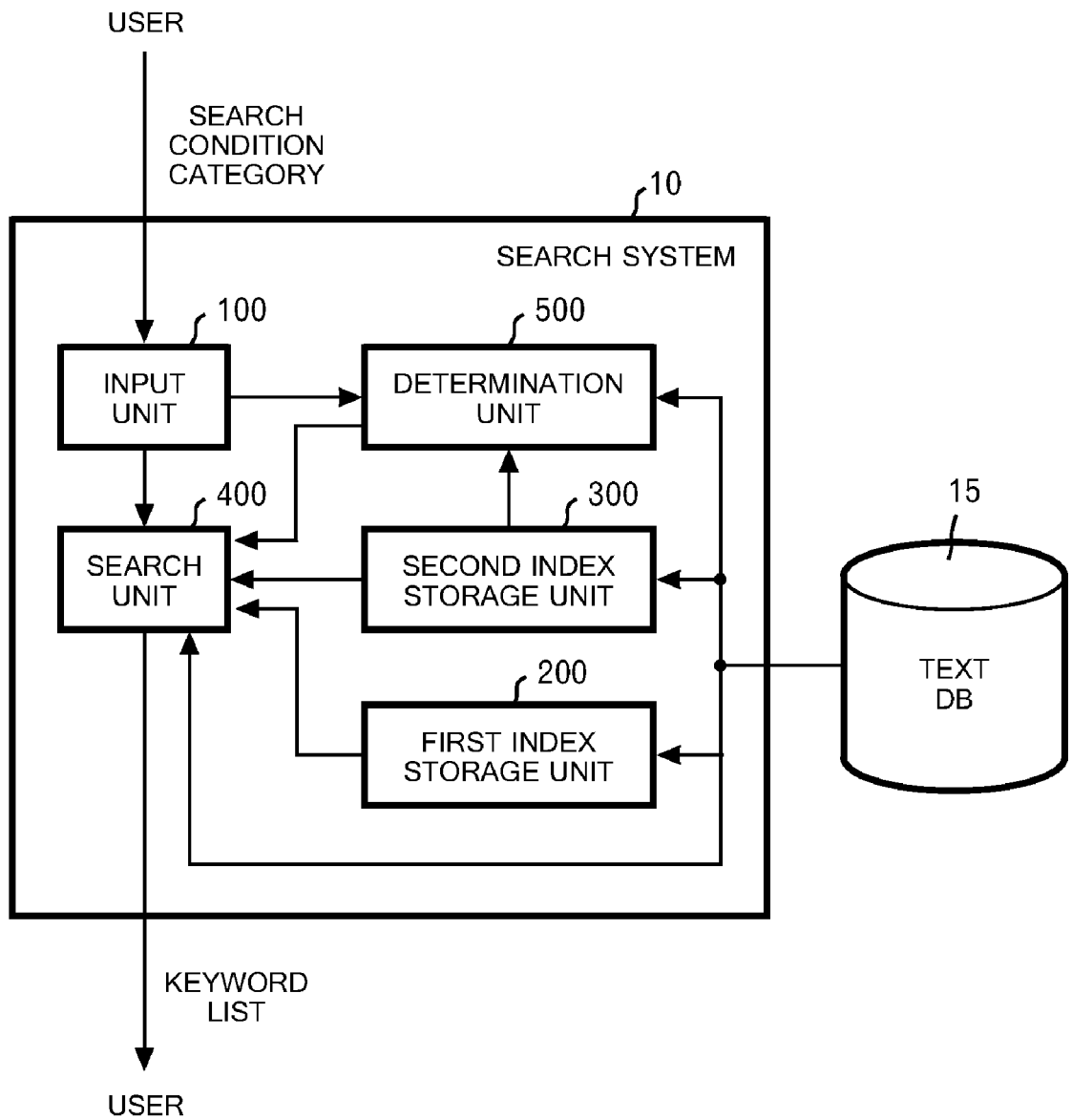
FIG. 1 is a block diagram showing an entire configuration of a search system 10.

FIG. 1 is a block diagram showing an entire configuration of a search system 10. The search system 10 is a system which detects keywords from among a plurality of texts stored in a text DB 15 and which outputs a list of the keywords thus detected to users. In particular, the search system 10 is a system for searching for high frequency words by selecting a predetermined standard number of keywords in descending order of the number of texts which contain the keywords out of a plurality of keywords and which satisfy a certain text search condition. A user can find keywords which are often used in a field in which the user is interested, by designating a condition for specifying the user's own target of interest as a text search condition.

An object of the search system 10 of the present embodiment is to perform a search process of such keywords more effectively than before.

The search system 10 includes an input unit 100, a first index storage unit 200, a second index storage unit 300, a search unit 400, and a determination unit 500. From a user, the input unit 100 receives an input of a text search condition as a condition of texts to be search targets for searching for keywords. Specifically, the input unit 10 may receive, as a text search condition, an input of keywords which are expected to be contained in the texts. In addition, the input unit 10 receives an input of a category of keywords to be search targets. Specifically, the input unit 10 may receive, as the categories, fields in which keywords to be search targets are used, or information showing word classes of the keywords.

The first index storage unit 200 stores, for each category of keywords, a first index which designates a list of keywords contained in the texts by using identifications of the respective texts. The first index is generated in advance based on a plurality of texts stored in the text DB 15, and is stored in the first index storage unit 200 prior to a search of the keywords. The second index storage unit 300 stores, for each category of keywords, a second index which designates a list of texts containing the keywords by using identifications of the respective keywords. Furthermore, the second index storage unit 300 stores the number of texts which contain the respective keywords in a way that the number corresponds to the second index. As in the case of the first index, the second index is also generated in advance based on the plurality of texts stored in the text DB 15.

The determination unit 500 reads the number of texts containing the respective keywords from the second index storage unit 200, the number being stored in away that the number corresponds to the second index. The determination unit 500 calculates an estimation of search time by the first index and an estimation of search time by the second index, based on the number of texts which contain keywords corresponding to an inputted category, and based on the number of texts which satisfy the text search condition among a plurality of texts to be search targets. Then, the determination unit 500 determines which one of the first and second indexes makes the search faster, based on these calculated estimations.

The search unit 400 searches texts satisfying the text search condition for keywords which have higher frequency of appearance than a predetermined standard, by using the index which has been determined to make a search faster, and outputs the keywords to the user. As described above, this standard is, for example, within a predetermined standard number of keywords in descending order of the number of texts which contain the keywords. The search unit 400 outputs a list of keywords satisfying such a standard.

Figure 2:
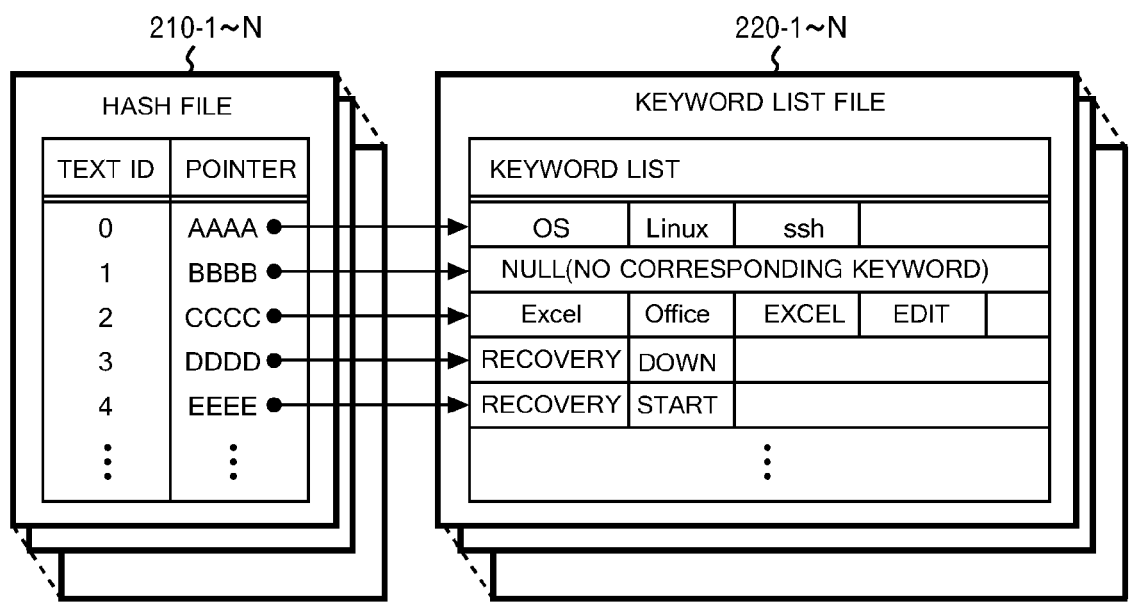
FIG. 2 is a diagram showing an example of a data structure of a first index storage unit 200.

FIG. 2 is a diagram showing an example of a data structure of the first index storage unit 200. The first index storage unit 200 stores hash files 210-1 to 210-N respectively provided for categories, and keyword list files 220-1 to 220-N respectively provided for categories. In the present embodiment, in order to avoid redundant descriptions, a hash file 210-1 is described to represent hash files 210-1 to 210-N, and a keyword list file 220-1 is described to represent keyword list files 220-2 to 220-N. Incidentally, the structures of the respective hash files 210-2 to 210-N are substantially the same as the structure of the hash file 210-1, and the structures of the respective keyword list files 220-2 to 220-N are substantially the same as the structure of the keyword list file 220-1.

The hash file 210-1 records pointers respectively indicating lists of keywords contained in the texts, in a way that the pointers correspond to identifications of the respective texts. For example, a pointer AAAA corresponding to a text 0 is a pointer for a list of keywords contained in the text 0. This pointer may be, for example, a recording position where the list is recorded in the keyword list file 220-1 to be described later.

The keyword list file 220-1 records, for each text, a list of keywords contained in the text. For example, the keyword list file 220-1 records a list of keywords consisting of OS, Linux and ssh, in a way that the list of keywords corresponds to the text 0. Furthermore, the keyword list file 220-1 stores a value (for example, NULL) indicating absence of keywords in a text 1, in a way that the value corresponds to the text 1. In the present embodiment, although keywords are shown as character strings for the sake of convenience of description, identifications for the respective keywords are actually recorded in the keyword list file 220-1.

Here, it is desirable that the hash file 210-1 has a hash structure, in which each identification of the texts is a hash key, and in which each pointer to the keywords is a hash value. This makes it possible to quickly obtain a list of keywords contained in a designated text. On the other hand, the keyword list file 220-1 may record, as a keyword list, data in a list structure in which a plurality of keywords are serially connected. In this case, when obtaining respective keywords from the keyword list, it requires processing time depending on a length of the keyword list.

Figure 3:
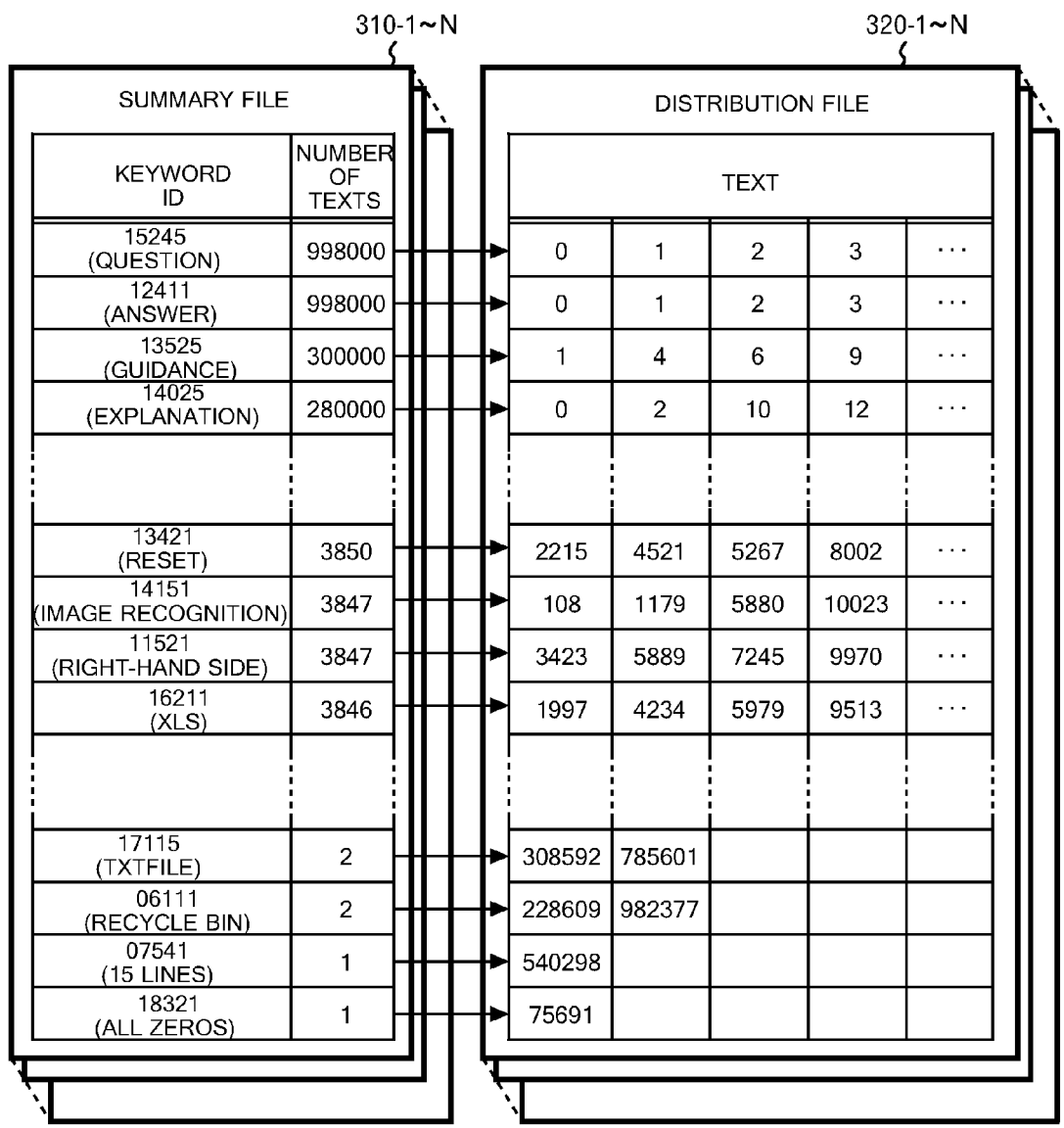
FIG. 3 is a diagram showing an example of a data structure of a second index storage unit 300.

FIG. 3 is a diagram showing an example of a data structure of the second index storage unit 300. The second index storage unit 300 stores summary files 310-1 to 310-N and distribution files 320-1 to 320-N. The second index storage unit 300 stores summary files 310-1 to 310-N respectively provided for categories, and distribution files 320-1 to 320-N respectively provided for categories. In the present embodiment, in order to avoid redundant descriptions, a summary file 310-1 is described to represent summary files 310-1 to 310-N, and a distribution file 320-1 is described to represent distribution files 320-1 to 320-N. Incidentally, the structures of the summary files 310-2 to 310-N are substantially the same as the structure of the summary file 310-1, and the structures of the distribution file 320-1 to 320-N are substantially the same as the structure of the distribution file 320-1.

The summary file 310-1 records, for each keyword, the number of texts containing the keyword in a way that the number corresponds to the identification of the keyword. For example, a keyword 15245 corresponds to "question," and there are 999000 texts which contain the keyword. The distribution file 320-1 records, for each keyword, a list of texts which contain the keyword. For example, the distribution file 320-1 records identifications (0, 1, 2, 3, . . . ) of texts containing the keyword 15245, in a way that the identifications correspond to the keyword 15245. That is, the keyword "question" is contained in a text 0, a text 1 and a text 2.

Here, it is desirable that the summary file 310-1 has a hash structure in which each identification of the keywords is a hash key, and in which each number of the texts containing the keyword is a hash value. This makes it possible to quickly obtain a list of texts containing a designated keyword. Moreover, it is desirable that the summary file 310-1 records the identifications of the keywords in a way that the identifications of the keywords are arranged in descending order of the number of texts containing the keywords. This makes it possible to enhance efficiency of a process of selecting keywords in descending order of frequency of appearance in a process of a selection unit 410 to be described later. On the other hand, the distribution file 320-1 may record, as a list of texts, data in a list structure in which the identifications of a plurality of texts are directly connected. In this case, when obtaining identifications of respective texts from a list of texts, it requires processing time depending on a length of the list of texts.

Incidentally, as an alternative to the example of FIG. 3, or in addition to the example thereof, the summary file 310-1 may record the total number of texts containing all keywords, in a way that the total number corresponds to the identification of a certain keyword, the number of texts containing the keywords being larger than the number of the text containing the certain keyword. That is, the summary file 310-1 may further record the total number of the texts corresponding to all keywords arranged as being followed by the certain keyword, in a way that the total number corresponds to the certain keyword. This makes it possible to speed up a process of estimating search time by a second search time calculation unit 540 to be described later.

Figure 4:
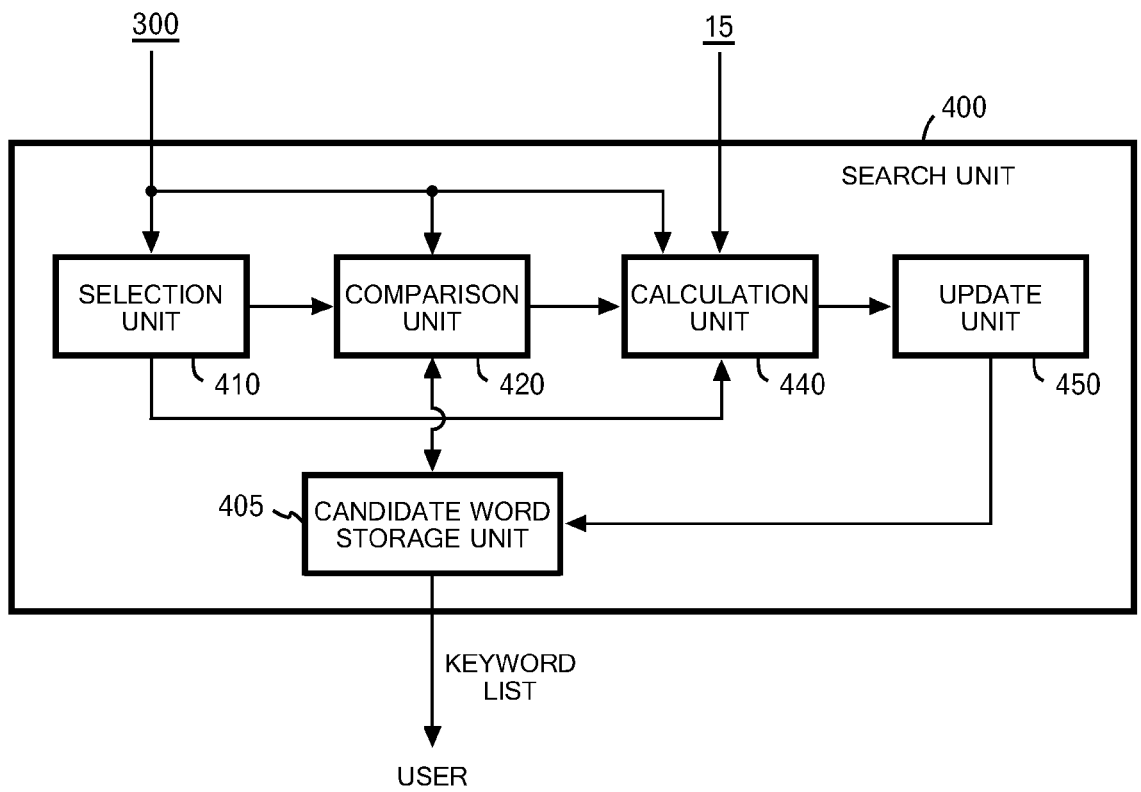
FIG. 4 is a block diagram showing a functional configuration of the search unit 400.

FIG. 4 is a block diagram showing a functional configuration of the search unit 400. In FIG. 4, a search function performed by the search unit 400 by using the second index is described. The search unit 400 includes a candidate word storage unit 405, a selection unit 410, a comparison unit 420, a calculation unit 440, and an update unit 450. Out of a plurality of keywords, the search unit 400 aims at searching for a predetermined standard number of keywords which are contained in texts containing the keywords and satisfying the text search condition, the searched keywords being arranged in descending order of the number of texts. Such keywords to be searched for are referred to as high frequency words.

The candidate word storage unit 405 stores the number of appearance of candidate words, the number being the number of texts which contain the candidate words and which satisfy the text search condition, in a way that the number of appearance corresponds to the candidate words to be candidates of high frequency words. That is, for example, when intending to search for N high frequency words, the candidate word storage unit 405 stores N candidate words. These candidate words may be any keywords at an initial stage. The selection unit 410 sequentially selects a plurality of keywords to be search targets in descending order of the number of texts containing the keyword, the selected keywords being selected as target words which are targets of determination whether they are high frequency words. For example, the selection unit 410 may sequentially obtain, in the arranged order, the identifications of a plurality of keywords which are arranged and recorded in the summary file 310-1 of the second index storage unit 300.

The comparison unit 420 reads the number of texts containing a certain target word from the summary file 310-1 of the second index storage unit 300. Then, the comparison unit 420 compares the read number of the texts with the number of appearance of the candidate words stored in the candidate word storage unit 405. The calculation unit 440 reads a list of texts containing this target word from the second index storage unit 300, provided that the read number of the texts is greater than the number of appearance of anyone of the candidate words. Then, the calculation unit 440 calculates the number of texts which satisfy the text search condition among the list of texts. The update unit 450 adds this target word as a candidate word to the candidate word storage unit 405, provided that the calculated number of texts is greater than the number of appearance of any one of the candidate words. Then, the update unit 450 removes one of the candidate words stored in the candidate word storage unit 405 from the candidate word storage unit 405. For example, in a case where N candidate words have been stored in the candidate word storage unit 405, the update unit 450 removes the N-th candidate word in descending order of the number of appearance of candidate words, from the candidate word storage unit 405.

The comparison unit 420, the calculation unit 440, and the update unit 450 repeatedly perform the above processes for each time a target word is selected by the selection unit 410. The search unit 400 outputs keywords stored in the candidate word storage unit 405 as high frequency words, provided that the number of texts containing the target word selected by the selection unit 410 is smaller than the number of appearance of any one of the candidate words.

Figure 5:
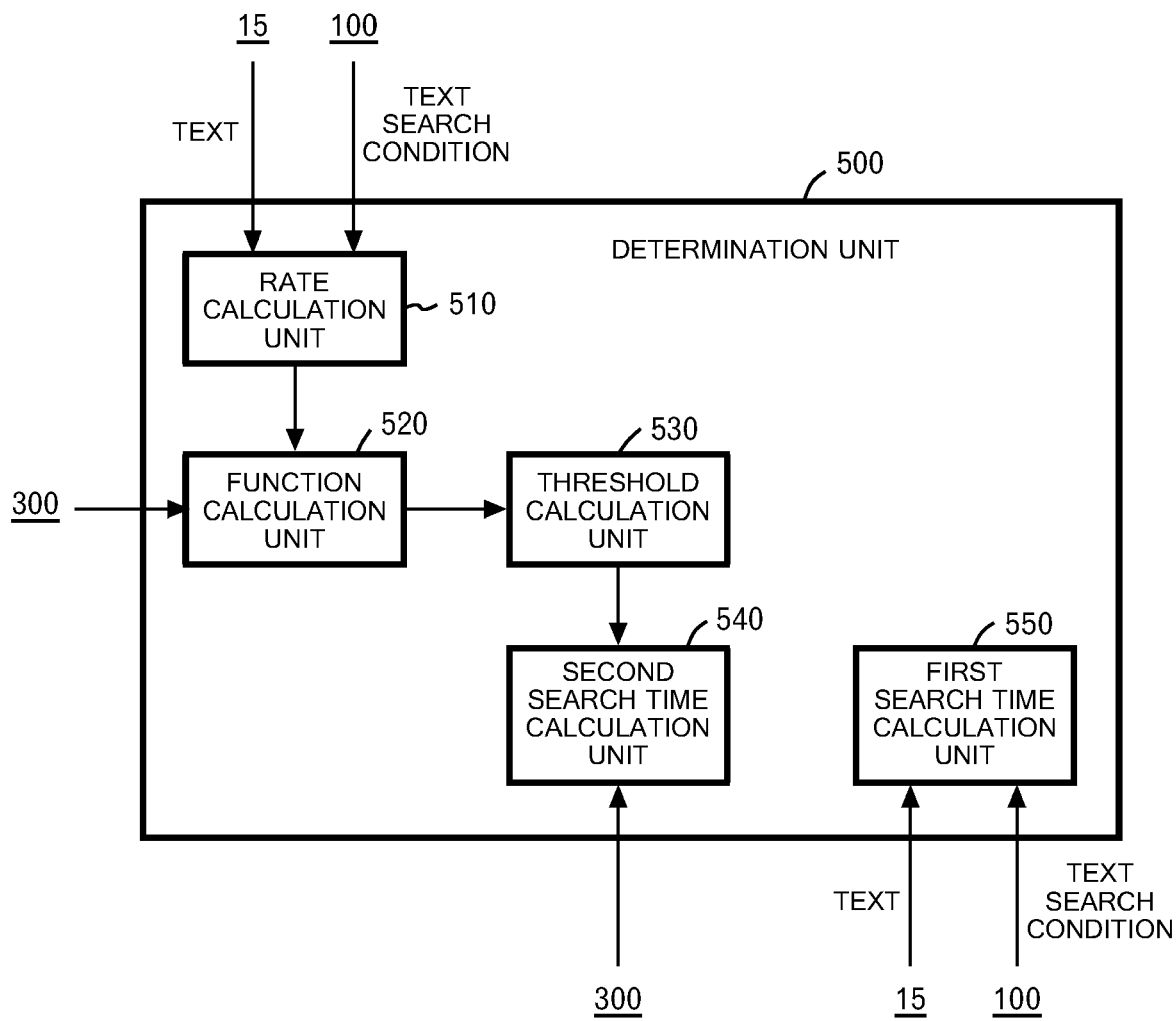
FIG. 5 is a block diagram showing a functional configuration of a determination unit 500.

FIG. 5 is a block diagram showing a functional configuration of the determination unit 500. The determination unit 500 includes a rate calculation unit 510, a function calculation unit 520, a threshold calculation unit 530, a second search time calculation unit 540, and a first search time calculating time 550. The rate calculation unit 510 calculates a condition fulfillment rate indicating the occupancy rate of texts which satisfy the text search condition among all texts to be search targets. For respective keywords, the function calculation unit 520 approximately calculates probability distribution of random variables indicating the number of texts which contain the keywords and which satisfy the text search condition, based on the calculated condition fulfillment rate. Specifically, the function calculation unit 520 approximates, using the above described condition fulfillment rate, a probability that the texts containing the respective keywords satisfy the text search condition, and calculates the probability distribution of random variables as a binominal distribution.

Then, the function calculation unit 520 calculates a function of a threshold for obtaining the sum of probabilities that the random variables of the respective keywords are not less than a certain threshold. The threshold calculation unit 530 calculates a threshold at which a value of the function thus calculated is approximately the same as a standard quantity. The second search time calculation unit 540 selects respective keywords which are contained in texts whose number is greater than the calculated threshold, using the summary file 310-1 of the second index storage unit 300. Then, using the summary file 310-1, the second search time calculation unit 540 calculates the total number of texts containing the selected keywords. Incidentally, as described above, the total number of texts containing a certain keyword, the frequency of appearance of the keyword being greater than that of other keywords, may be calculated in advance, and recorded in the summary file 310-1. In this case, the second search time calculation unit 540 may obtain the above sum from the summary file 310-1.

Then, the second search time calculation unit 540 calculates a product of the calculated sum and predetermined access time, as an estimation of search time by the second index. The first search time calculation unit 550 calculates a product of the number of texts satisfying the text search condition, and predetermined access time, as an estimation of search time by the first index. This predetermined access time is, for example, obtained by adding a product of time (sequential access time) for sequentially reading keywords from a list of keywords and the number of keywords for a text, to time (random access time) for obtaining a list of keywords by finding an identification from among the identifications of texts contained in the first index. Alternatively, the predetermined access time may be approximated by the above random access time or by another predetermined value. Once the estimations of search time are calculated, the determination unit 500 determines that searching by the second index is faster, provided that the estimation of search time calculated by the second search time calculation unit 540 is smaller than that calculated by the first search time calculation unit 550.

Figure 6:
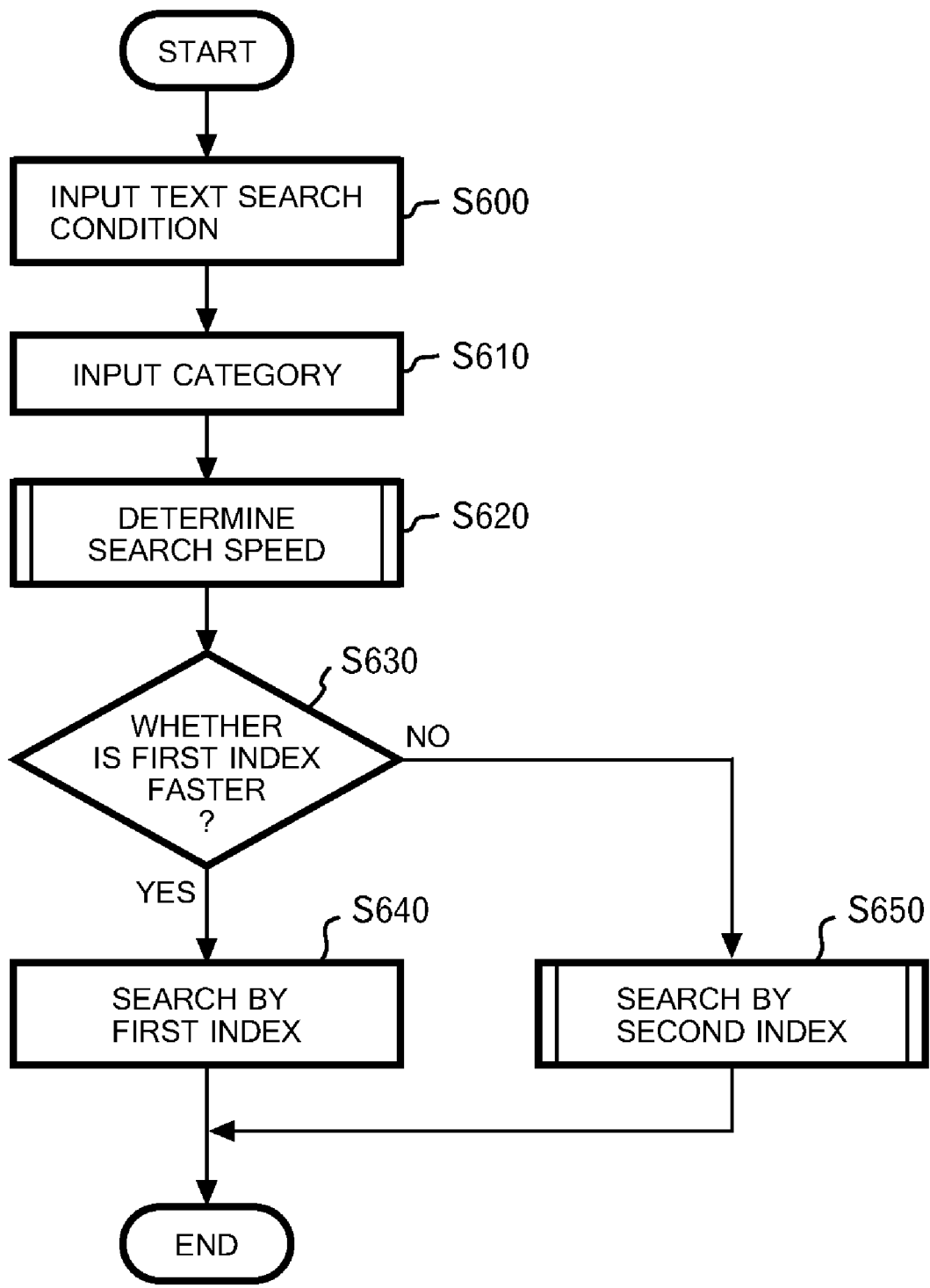
FIG. 6 is a flowchart of searching for keywords by using the search system 10.

FIG. 6 is a flowchart of searching for keywords by using the search system 10. The input unit 100 receives an input of a text search condition (S600) and an input of a category (S610). The determination unit 500 calculates an estimation of search time by the first index and an estimation of search time by the second index, based on the number of texts satisfying the text search condition and the number of texts containing respective keywords (S620). The determination unit 500 compares the estimation of search time by the first index and the estimation of search time by the second index, and determines which index makes the search faster (S630).

Then, if it is determined that a search using the first index is faster than a search using the second index (S630: YES), the search unit 400 performs a search using the first index (S640). On the other hand, if it is determined that a search using the second index is faster than a search using the first index (S630: NO), the search unit 400 performs a search using the second index (S650).

Figure 7:
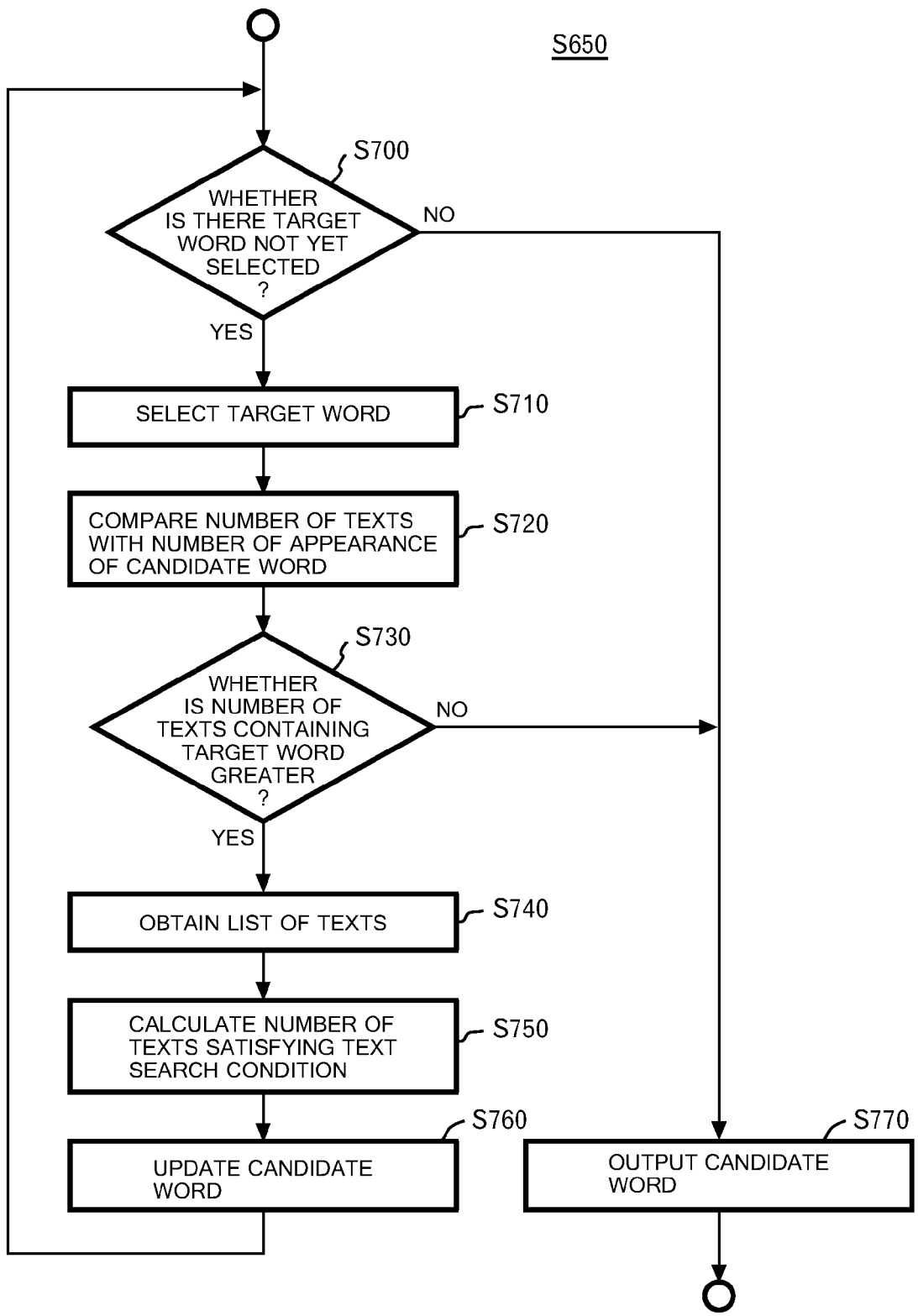
FIG. 7 is a flowchart showing details of a process in S650.

FIG. 7 is a flowchart showing the details of a process in S650. The selection unit 410 determines whether there are keywords which have not yet been selected as target words in the inputted category (S700). In a case where there are such words (S700: YES), the selection unit 410 selects, from among the keywords which have not been selected as target words, a keyword as a target word, the keyword being contained in texts whose number is the largest (S710). Then, the comparison unit 420 compares the number of the texts containing this target word, and the number of appearance of candidate words stored in the candidate word storage unit 405 (S720).

Provided that the number of the texts containing this target word is greater than the number of appearance of any one of the candidate words (S730: YES), the calculation unit 440 obtains a list of texts containing this target word from the second index storage unit 300 (S740). Then, the calculation unit 440 calculates the number of texts which satisfy the text search condition among texts contained in the above list of texts (S750). Provided that the calculated number of the texts is greater than the number of appearance of any one of the candidate words, the update unit 450 selects, from among this target word and the candidate words, new candidate words in descending order of the number of texts containing respective words, in a way that the number of the candidate words is limited within the standard number, and updates the candidate word storage unit 405 (S760). Specifically, the update unit 450 adds this target word as a candidate word to the candidate word storage unit 405 (S760). In a case where the above addition causes the number of candidate words to exceed the standard quantity, the update unit 450 removes one of the candidate words stored in the candidate word storage unit 405 from the candidate word storage unit 405.

In a case where all keywords of the inputted category have already been selected as target words (S700: NO), the search unit 400 causes a process to proceed to S770. Furthermore, provided that the number of texts containing the target word is smaller than the number of appearance of any one of the candidate words (S730: NO), the search unit 400 causes a process to proceed to S770. In S770, the search unit 400 outputs the candidate words stored in the candidate word storage unit 405 as high frequency words (S770).

As described above, in a process shown in S730 of FIG. 7, even in a case where not all of keywords are selected as target words, the process is terminated at the time when it is determined that a high frequency word is not searched for in processes which follow. This makes it possible to make the number of repeated processes shown in FIG. 7 less than the number of keywords, thereby making it possible to enhance efficiency of searching high frequency words. It was confirmed by experiments conducted by the inventors that, in most cases for practical applications, the process in FIG. 7 was performed faster than a search using the first index.

Incidentally, by examining the efficiency of the process in FIG. 7, it is considered that the efficiency of this process is reduced in the following two cases:

(1) A case where an upper limit of the number of repeated processes is high, since the number of target words is large.

This is the case where an inputted category contain many keywords. A typical example of such a category is "noun" or the like.

(2) A case where the number of repeated processes is approximately the same as the number of target words, since determination in S730 is not "NO".

This is the case where an inputted category contain many keywords whose number is substantially the same as the number of texts. For example, in a call center receiving comments and requests on products by telephone, an operator records customers' names, comments and the like on texts. The texts are managed for respective customers, and statically analyzed to be used for improvement of products in future. In such a case, if it is rare that an operator takes a plurality of comments from the same customer, a keyword belonging to a category which is customers' name is a typical example of the case (2).

The search system 10 of the present embodiment beforehand determines a search environment such as the above, based on a distribution of the number of appearance of keywords or the like, and properly determines whether a search using the second index is faster. Hereinafter, the process thereof is described with reference to FIG. 8.

Figure 8:
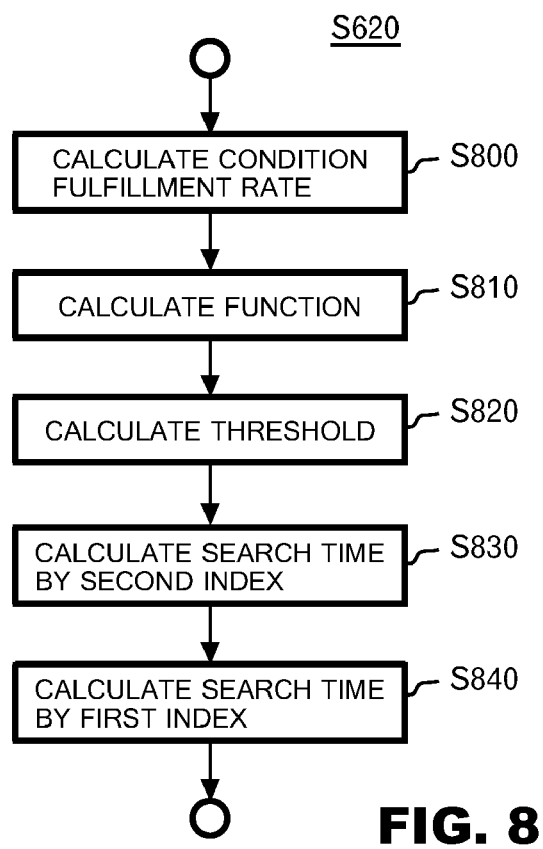
FIG. 8 is a flowchart showing details of a process in S620.
Figure 9:
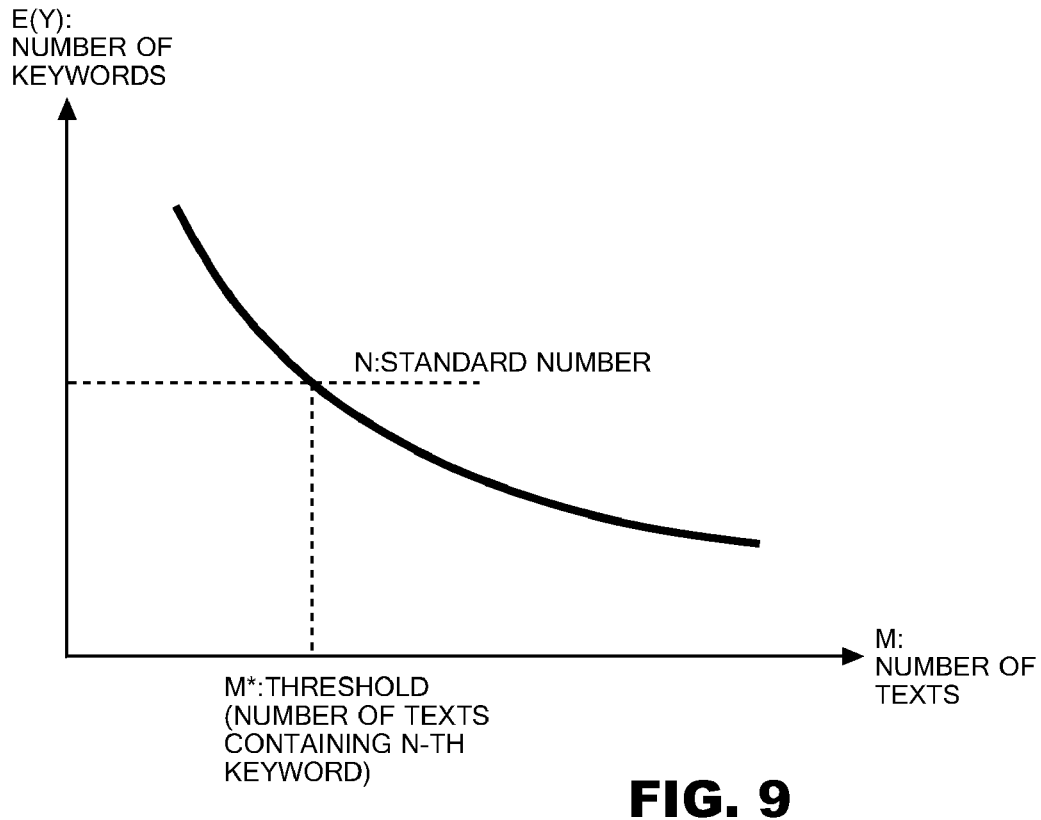
FIG. 9 is a graph showing a function to be calculated in S810.

FIG. 8 is a flowchart showing the detail of a process in S620. FIG. 9 is a graph showing a function to be calculated in S810. The rate calculation unit 510 calculates a condition fulfillment rate (S800). Respectively denoting the number of all texts to be search targets by #D and the number of texts satisfying the text search condition by #Ds, the condition fulfillment rate is expressed by #Ds/#D.

Next, the function calculation unit 520 calculates a function of a threshold for obtaining the sum of probabilities at which random variables of respective keywords are not less than a certain threshold (S810). Specifically, first, for respective keywords, the function calculation unit 520 approximately calculates probability distribution of random variables indicating the number of texts which contain the keywords and which satisfy the text search condition, based on a calculated condition fulfillment rate. An example of this probability distribution is a binominal distribution. A probability distribution is determined by assuming that, for any one of the keywords, the probability that texts containing the keyword satisfy the text search condition is the above-described condition fulfillment rate.

Here, a random variable $X_i$ is defined for a keyword i. A binominal distribution indicating the distribution of the number of texts containing the keyword i is expressed by $B(n, p)=B(\#D_i, \#Ds/\#D)$. Note that the number of texts containing the keyword i is denoted by #Di. Moreover, for the keyword i and an integer M indicating a certain threshold, the following random variable $Y_i$ is defined.

$Y_i=1$ $(X_i \geq M)$ $Y_i=0$ $(X_i < M)$

Using this random variable $Y_i$, the function calculation unit 520 calculates a function of a threshold M for obtaining the sum of probabilities that random variables for respective keywords are not less than the threshold M. This function is expressed by E(Y) as follows.

$$E(Y) = E\left(\sum_{i=1,2,\ldots,I} Y_i\right) = \sum_{i=1,2,\ldots,I} E(Y_i)$$
$$= \sum_{i=1,2,\ldots,I} P(Y_i \geq M)$$

The threshold calculation unit 530 calculates the threshold M at which this function E(Y) is approximately the same as a standard quantity N (S820). The value of the threshold M at this time is denoted by M*. The function E(Y) becomes a monotonically decreasing function for the threshold M as shown in FIG. 9. Therefore, for example, the threshold calculation unit 530 may calculate the value of M at which the value of the function E(Y) becomes N by employing a binary search. Furthermore, the threshold calculation unit 530 may calculate the value of $P(Y_i \geq M)$ for a certain threshold M by employing, for example, a calculation procedure which is a so-called STING algorithm (page 6 in Wei Wang, Jiong Yang, Richard Muntz: STING: A Statistical Information Grid Approach to Spatial Data Mining, Proceedings of the 23$^{rd}$ VLDB Conference, Athens, Greece August 1997). This makes it possible to achieve speedup of the calculation of the threshold M in S820.

Subsequently, the second search time calculation unit 540 calculates an estimation of process time of a search using the second index by using this threshold (S830). Specifically, first, the second search time calculation unit 540 selects respective keywords contained in texts whose number is greater than the calculated threshold, by using the summary file 310-1 of the second index storage unit 300. Then, the second search time calculation unit 540 calculates the total number of the texts containing the keywords thus selected by using the summary file 310-1. Incidentally, as already mentioned, the total number of texts containing a keyword whose number of appearance is greater than that of a certain keyword may be calculated in advance, and recorded in the summary file 310-1. In this case, the second search time calculation unit 540 may obtain this total number from the summary file 310-1. The second search time calculation unit 540 outputs a product of the above calculated total number and predetermined access time, as an estimation of process time of a search.

Here, it is desirable that the predetermined access time is time required for a process of selecting respective keywords while sequentially tracing keywords from the head of a list of keywords in one text in the distribution file 320-1 shown in FIG. 3. For example, the second search time calculation unit 540 may calculate a mean value of the lengths of lists of keywords, and calculate, as access time, time for a process of tracing a list of keywords, the lengths of the list being the same as the mean value thereof. Alternatively, the predetermined access time may be approximated by a predetermined constant value, and set.

Next, the first search time calculation unit 550 calculates an estimation of process time of a search using the first index (S840). For example, the first search time calculation unit 550 calculates a product of the number of texts satisfying a text search condition and predetermined access time, as an estimation of search time by the first index. Here, the predetermined access time is calculated, for example, by the following equation.

Random access time+Mean value of the numbers of keywords contained in one text×Sequential access time Here, the random access time is time required for a process in which respective texts satisfying a text search condition are selected and in which lists of keywords corresponding to the selected respective texts are selected. Moreover, the sequential access time is time required for a process in which, for one text, keywords contained in the text are sequentially selected and in which each number of appearance of each keyword is added up. The random access time and the sequential access time may be approximated by a predetermined constant value, independently of keywords which are searching targets.

As described above with reference to FIGS. 8 and 9, the determination unit 500 is capable of quickly calculating, without performing an actual search process, time required for a search by using the first index and time required for a search by using the second index. Consequently, prior to an actual search process, it is possible to appropriately determine which index should be used for searching for keywords.

FIG. 10 is a table showing searched results of keywords to be searched by the present embodiment. In a set of texts, the vertical axis of FIG. 10 shows a list of high frequency words searched by the search system 10, in a case where a "substantive word" of word classes is designated as a category. Furthermore, in a set of the same texts, the horizontal axis of FIG. 10 shows a list of high frequency words searched by the search system 10, in a case where a "main subject" of contents of the texts is designated as a category.

As regards the substantive words, keywords such as China, Reuter, Japan and Tokyo have been searched for as keywords frequently appearing in this order. As regards the main subjects, keywords such as Society, Sports, Business and International have been searched for as keywords frequently appearing in this order. In this way, the search system 10 of the present embodiment makes it possible to quickly search for keywords frequently appearing in respective categories.

Furthermore, at each of intersections of a vertical axis and a horizontal axis, the number of texts in which respective keywords appear together is indicated. On each line under the lines indicating the numbers of texts, an index value which shows a level of correlation of the respective keywords is indicated. Since the search system 10 of the present embodiment is capable of obtaining lists of texts containing respective keywords by using the second index, it is also possible to efficiently calculate the number of texts in which a plurality of keywords appear together.

FIG. 11 is a table showing a comparison between time required for searching for keywords by a conventional technique and time required for searching for keywords by a proposed technique. In this search, keywords contained in texts are used as a text search condition. That is, in this search, texts which contain "WIN95" as a keyword are targets for searching. Moreover, in this search, general noun, noun, proper noun, command, hardware, software and technical term are respectively used as categories for keywords. Then, with respect to the respective categories, an experiment for measuring time required for a search was conducted.

FIG. 11 shows a comparison between time required for searches by the search system 10 of the present embodiment and time required for searches by a technology described in Nasukawa, T. and Nagano, T. "Text analysis and knowledge mining system", IBM systems Journal 40 (4): 967-984 (2001). It was confirmed that, in any category, keywords were searched extremely faster by the search system 10 than by the conventional technique.

FIG. 12 is a table showing a comparison between time required for searches using the first index (DOC_TO_KEY Index) and time required for searches using the second index (KEY_TO_DOC Index). Required time shown in FIG. 12 is time required for performing both of searches using the first index and searches using the second index under the same condition, independently of determined results by the determination unit 500. Underlined required time in FIG. 12 shows time required for searches using the index which was determined by the determination unit 500 that the index makes it faster to search for keywords. As is clear from FIG. 12, it was confirmed that correct determinations for faster searches were made in four out of five cases. Moreover, although an incorrect determination was made for the remaining one case, it was confirmed that the time required for that search was quire close to the time in the case of the correct determination.

Figure 13:
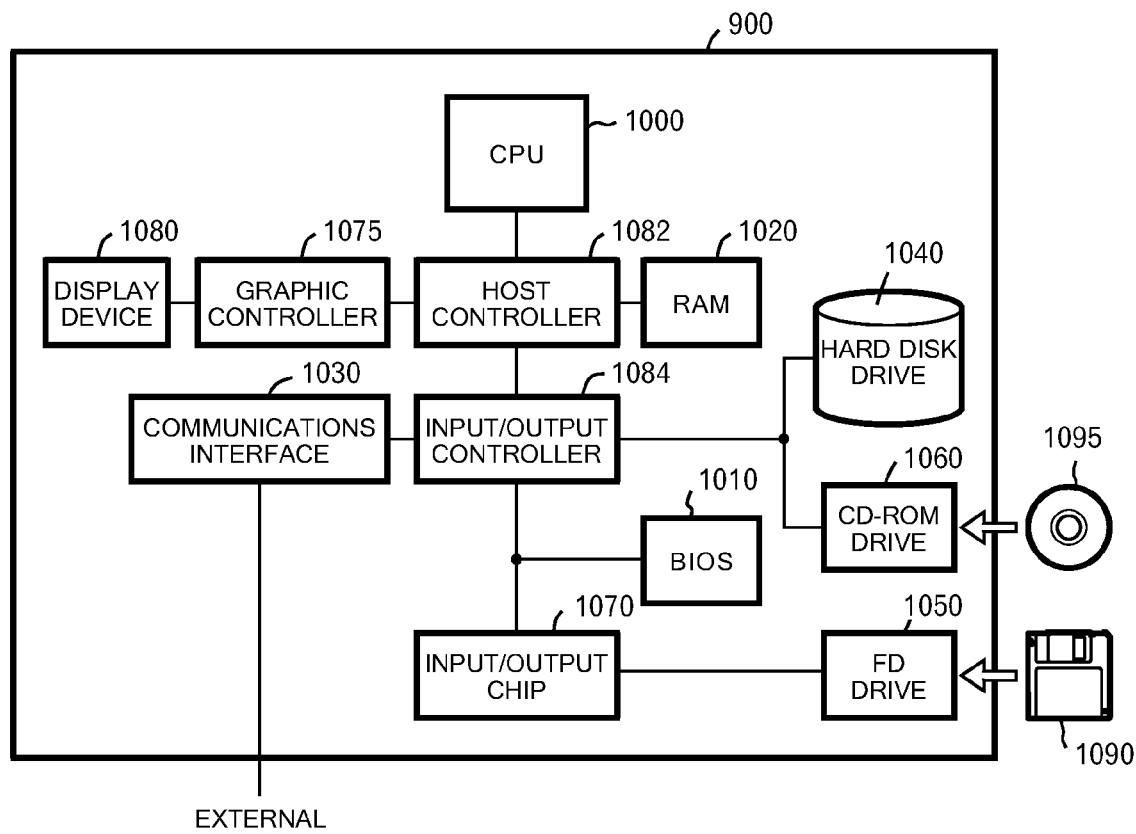
FIG. 13 is a block diagram showing an example of a hardware configuration of an information processing apparatus functioning as the search system.

FIG. 13 is a block diagram showing an example of a hardware configuration of an information processing apparatus 900 functioning as the search system 10 of the present embodiment. The information processing apparatus 900 includes: a CPU peripheral unit having a CPU 1000, a RAM 1020, and a graphic controller 1075, which are mutually connected by a host controller 1082; an input/output unit having a communications interface 1030, a hard disk drive 1040, and a CD-ROM drive 1060, which are connected to the host controller 1082 by an input/output controller 1084; and a legacy input/output unit having a BIOS 1010, a flexible disk drive 1050, and an input/output chip 1070, which are connected to the input/output controller 1084.

The host controller 1082 connects the RAM 1020, the CPU 1000 accessing the RAM 1020 at a high transfer rate, and the graphic controller 1075. The CPU 1000 operates based on programs stored in the BIOS 1010 and the RAM 1020, and controls respective units. The graphic controller 1075 obtains image data which are generated on a frame buffer provided to the RAM 1020 by the CPU 1000 and the like, and displays the image data on a display device 1080. Alternatively, the graphic controller 1075 may include therein a frame buffer which stores image data generated by the CPU 1000 and the like.

The input/output controller 1084 connects the host controller 1082, the communications interface 1030 which is a relatively fast input/output device, the hard disk drive 1040, and the CD-ROM drive 1060. The communications interface 1030 communicates with external devices via a network. The hard disk drive 1040 stores programs and data to be used by the information processing apparatus 900. The CD-ROM drive 1060 reads a program or data from a CD-ROM 1095, and provides the program or data to the RAM 1020 or the hard disk drive 1040.

Furthermore, the BIOS 1010 and relatively slow input/output devices such as the flexible disk drive 1050 or the input/output chip 1070 are connected to the input/output controller 1084. The BIOS 1010 stores a boot program executed by the CPU 1000 when starting the information processing apparatus 900, a program depending on the hardware of the information processing apparatus 900, and the like. The flexible disk drive 1050 reads a program or data from a flexible disk 1090, and provides the program or data to the RAM 1020 or the hard disk drive 1040 via the input/output chip 1070. The input/output chip 1070 connects the flexible disk 1090, and various kinds of input/output devices via, for example, a parallel port, a serial port, a keyboard port, a mouse port, and the like.

A program provided to the information processing apparatus 900 is stored in a recording medium such as the flexible disk 1090, the CD-ROM 1095, or an IC card, and is provided by a user. The program is read from a recording medium via the input/output chip 1070 and/or the input/output controller 1084, installed in the information processing apparatus 900, and executed. Operations performed by the information processing apparatus 900 and the like by means of execution of programs are the same as those by the search system 10 described in FIGS. 1 to 12, hence the description thereof is omitted.

The above programs may be stored in an external recording medium. As the recording medium, in addition to the flexible disk 1090 and the CD-ROM 1095, an optical recording medium such as a DVD or a PD, a magneto optic recording medium such as an MD, a tape recording medium, a semiconductor memory such as an IC card, or the like can be used. Moreover, a storing device such as a hard disk or a RAM which is provided to a server system connected to a private communications network and the Internet may be used as a recording medium, and a program may be provided to the information processing apparatus 900 via a network.

The present invention makes it possible to search for keywords, which are used with higher frequency in texts satisfying predetermined conditions, more effectively than before.

As described above, although the present invention has been described by using the embodiment, the technical scope of the present invention is not limited to the scope as recited in the above embodiment. It is obvious to those skilled in the art that various changes or improvements can be added to the above embodiment. For example, the search system 10 as described in the embodiment can be applied not only to text mining but also to data mining of a database which consists of records with annotations including category information. That is, in a database in which a hierarchical structure is defined between each of categories, upper categories are treated as categories of the present embodiment, and lower categories are treated as keywords, thereby it is possible to enumerate lower categories in which users are interested, depending on levels of possibilities of the categories. It is obvious from description in the scope of claims that embodiments to which such changes or improvements are added can also be included in the technical scope of the present invention.

Although the preferred embodiment of the present invention has been described in detail, it should be understood that various changes, substitutions and alterations can be made therein without departing from spirit and scope of the inventions as defined by the appended claims.

What is claimed is:

1. A system for searching keywords from texts, the system comprising:
   a first index storage unit storing a first index which designates a list of keywords contained in the texts from identification information of the respective texts, wherein the first index is generated in advance based on a plurality of texts stored in a text database, and the first index is stored in the first index storage unit prior to a search of the keywords;
   the storage unit further storing hash files of categories of keywords in the first index storage unit, with the hash files indicating pointers to lists of keywords contained in the texts;
   a second index storage unit for storing a second index which designates a list of texts containing the keywords from identification information of the respective keywords, in a way that the second index corresponds to a number of texts containing the respective keywords, wherein the second index is generated in advance based on the plurality of texts stored in the text database;
   an input unit
      receiving an input of a text search condition which is a condition of keywords contained in the texts;
      the input unit further receiving at least one of: fields in which keywords to be search targets are used, or information showing word classes of the keywords;
   a determination unit
      reading the number of texts containing the respective keywords from the second index storage unit;
      the determination unit further calculating an estimation of search time by the first index and an estimation of search time by the second index, based on the number of texts satisfying the text search condition among a plurality of texts to be searched, and based on the number of the texts stored corresponding to the second index; and
      determining which one of the first and the second indexes makes a search faster;
   a search unit for searching for and outputting keywords which appear in texts satisfying the text search condition with higher frequency than a predetermined standard, by using the index which is determined to make the search faster and the search unit outputs the keywords to a user;
   a ratio calculation unit for calculating a condition fulfillment rate indicating an occupancy ratio of texts which satisfy the text search condition among all texts to be searched;
   a function calculation unit for approximately calculating, based on the condition fulfillment rate, probability distributions of probability variables indicating the number of texts which contain the respective keywords and which satisfy the text search condition, and for calculating, based on a calculated probability distribution, a function for a threshold for obtaining the sum of probabilities that the probability variables of the respective keywords are not less than the threshold, wherein the function for calculating the threshold is:

$$E(Y) = E(\Sigma_{i=1,2,\ldots,I} Y_i) = \Sigma_{i=1,2,\ldots,I} E(Y_i)$$

$$= \Sigma_{i=1,2,\ldots,I} P(Y_i > M)$$ wherein M is the threshold, i represents a keyword, and $Y_i$ represents a random variable;

a threshold calculation unit for calculating the threshold at which the calculated function is substantially the same as the standard number;

a second search time calculation unit for calculating the number of texts containing the respective keywords contained in texts whose number is greater than the calculated threshold, based on the number of the texts stored in the second index storage unit, and for calculating a product of the calculated number of texts and predetermined access time, as an estimation of search time by the second index; and a first search time calculation unit for calculating a product of the number of texts which satisfy the text search condition among a plurality of the texts to be searched and the predetermined access time, as an estimation of search time by the first index, wherein the determination unit determines that a search by the second index is faster, conditional upon the estimation of search time calculated by the second search time calculation unit is smaller than the estimation of search time calculated by the first search time calculation unit.

2. The system according to claim 1, wherein the function calculation unit calculates the probability distribution of probability variables as a binominal distribution by approximating, for each keyword, through the condition fulfillment rate, a probability that texts containing the keyword satisfies the text search condition, and calculates a function for the threshold based on the calculated probability distribution.

* * * * *